United States Patent [19]

Sloane

[11] 3,926,091

[45] Dec. 16, 1975

[54] MANUFACTURE OF TOOTHED WORKPIECES

[75] Inventor: Clifford Sloane, Neath, England

[73] Assignee: Cam Gears Limited, Hitchin, England

[22] Filed: June 13, 1974

[21] Appl. No.: 479,123

[30] Foreign Application Priority Data
June 14, 1973 United Kingdom............... 28366/73

[52] U.S. Cl..................................... 90/1.4; 90/10
[51] Int. Cl.² ........................................ B23F 19/10
[58] Field of Search ................. 90/1.4, 1.6, 7, 8, 10

[56] References Cited
UNITED STATES PATENTS

| | | | |
|---|---|---|---|
| 2,343,407 | 3/1944 | Galloway | 90/1.4 |
| 3,802,314 | 4/1974 | Flint | 90/1.4 |
| 3,818,795 | 6/1974 | Upham | 90/1.4 |

Primary Examiner—Leonidas Vlachos

[57] ABSTRACT

An improved method and apparatus are utilized to chamfer or remove burrs from the end faces of a plurality of gear teeth on a workpiece. The workpiece is disposed within a circular array of cutting tools. The cutting tools are moved radially inwardly to bring cutting edges on the tools into engagement with the end faces of the gear teeth. Simultaneously with the radial inward movement of the cutting tools, the workpiece and cutting edges are moved circumferentially relative to each other so that the cutting edges remove surplus metal from the end faces of the gear teeth. The circumferential movement of the cutting edges relative to the end faces of the gear teeth is limited so that each cutting edge is effective to remove excess metal from the end face of only one of the gear teeth.

20 Claims, 5 Drawing Figures

MANUFACTURE OF TOOTHED WORKPIECES

BACKGROUND OF THE INVENTION

This invention relates to the manufacture of gears and other workpieces having axially extending external teeth.

During the manufacture of a pinion or gear wheel it frequently occurs that a small amount of surplus metal or a burr is formed at one or both axial end faces of the teeth, this is particularly so after the teeth have been hobbed. Hitherto it has been the practice to manually grind away such burrs subsequent to heat treatment of the workpiece and thereby provide clean or chamfered edges at the axial end faces of the teeth. This grinding process is both inconvenient and time consuming, which latter of course can add considerably to the manufacturing costs (particularly when the workpieces are mass-produced).

SUMMARY OF THE PRESENT INVENTION

According to the present invention there is provided a method and apparatus for removing surplus metal (de-burring or chamfering) from the axial end faces of teeth on a gear or other workpiece. A cutting edge for each tooth is moved radially and rotated circumferentially relative to the gear so that the cutting edges de-burr or chamfer the end faces of their respectively associated teeth. The circumferential rotation is limited so that each cutting edge is restricted to de-burring or chamfering the end face of its associated tooth.

The burr which is formed at the end face of a gear tooth usually follows the profile of that tooth. To prevent undue removal of metal from the workpiece, it is therefore preferred that the movement of the cutting edges substantially follow the profiles of their respective teeth while chamfering or removing the burrs. Since the burrs are formed along teeth end face edges which have a generally involute profile, the displacement of the cutting edges relative to the workpiece, desirably, substantially follows an involute path complementary to the aforementioned edges of the teeth end faces during removal of the burrs. It will be appreciated however that the present invention may be applied to other tooth profiles having edges at the teeth end faces which are of non-rectilinear (usually curved) profile.

BRIEF DESCRIPTION OF THE DRAWINGS

One embodiment of the present invention will be described, by way of example only, with reference to the accompanying illustrative drawings in which.

DESCRIPTION OF ONE EMBODIMENT OF THE INVENTION

Figure 1:
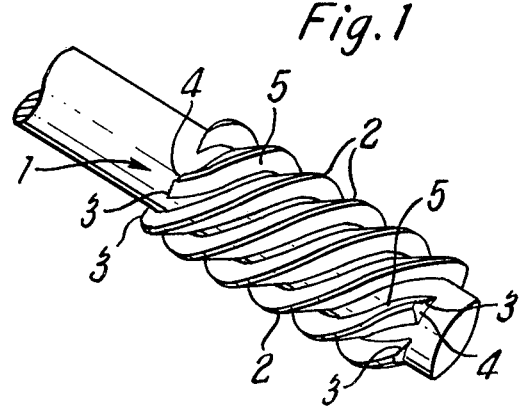
FIG. 1 is a perspective view of part of a conventionally formed pinion having helical teeth.
Figure 2:
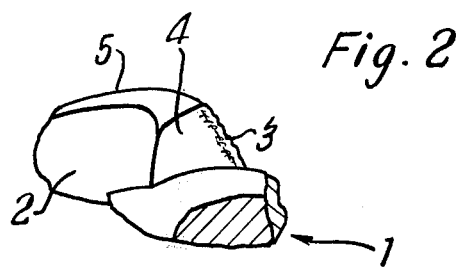
FIG. 2 is an enlarged view of part of the pinion shown in FIG. 1 and depicting an end face of a tooth having surplus metal in the form of a burr which is intended to be removed by the method and apparatus of the invention.

A pinion gear 1 shown in FIGS. 1 and 2 is conventionally formed from cylindrical stock to have a circumferential array of external helical teeth 2. The number of such teeth will vary between pinions and, for convenience, a pinion having four teeth will be considered. During manufacture of the pinion 1 the teeth 2 are hobbed, the effect of which is to form, at each axial end face of each tooth, a burr 3. More particularly, these burrs 3 tend to be formed at a radially extending edge of a tooth. This tooth edge has an involute profile and is defined by the end face 4 of a tooth (which end face substantially lies in a radial plane of the pinion) and the helically extending side face 5 of the tooth. The side face 5 subtends an acute angle with the end face 4. It should be noted that burrs 3 are formed at both axial end portions of each of the teeth 2.

Hitherto the burrs 3 have been removed manually as by grinding after heat treatment of the pinion. To alleviate the tedium and expense of such manual de-burring, an apparatus constructed in accordance with the present invention is operable to de-burr both ends of the gear. The apparatus includes a frame 6 (FIGS. 3 and 4) secured to which is a stationary annular housing 7. The pinion 1 is closely received within the housing 7 (as shown in dashed lines in FIG. 4) so that its teeth 2 project axially from each side of the housing. The pinion is prevented from rotating in the housing and is orientated therein with its teeth in a predetermined circumferential position. Accurate location and orientation of the pinion in the housing can be achieved by an appropriate key secured to the frame 6 engaging with an axially extending keyway in the pinion shank (for example, a key may be located in a socket 8 secured to the frame 6 to receive the end of the pinion). The engaging key and keyway also provides a convenient way of preventing rotation of the pinion relative to the housing 7.

Fixed to the frame 6 are a pair of axially opposed and spaced annular plates 9 and 10 which are substantially co-axial with the pinion 1. Each of these plates 9 and 10 is provided with four circumferentially spaced cam slots 11 and 12 respectively. Located between the fixed plates 9 and 10 are a pair of carrying plates 13 and 14. These plates 13 and 14 are mounted on the annular plates 9 and 10 respectively and are capable of limited circumfertial rotation relative thereto through appropriate bearings (not shown) on the frame 6.

Since a burr 3 at one end of the gear 1 has a slope which is opposite from the slope of a burr at the other end of the gear, the carrying plates 13 and 14 are intended to exhibit predetermined reciprocable arcuate (circumferential) movement in opposite senses of direction. Such arcuate movement of the plates 13 and 14 is achieved by providing each of them with a fixed radially extending lever 13a and 14a respectively. The levers 13a and 14a are pivotally connected to one end of extension levers 15 and 16 respectively the other ends of which extension levers are pivotally connected to a carriage 17. The carriage 17 is linearly reciprocable by a fluid pressure operated double acting piston and cylinder device 18 through a piston rod 19.

By extension or withdrawal of the piston rod 19, axial reciprocating movement of the carriage 17 is converted into rotary movement of the carrying plates 13 and 14 through the linkages 13a, 15 and 14a, 16 respectively.

Figure 3:
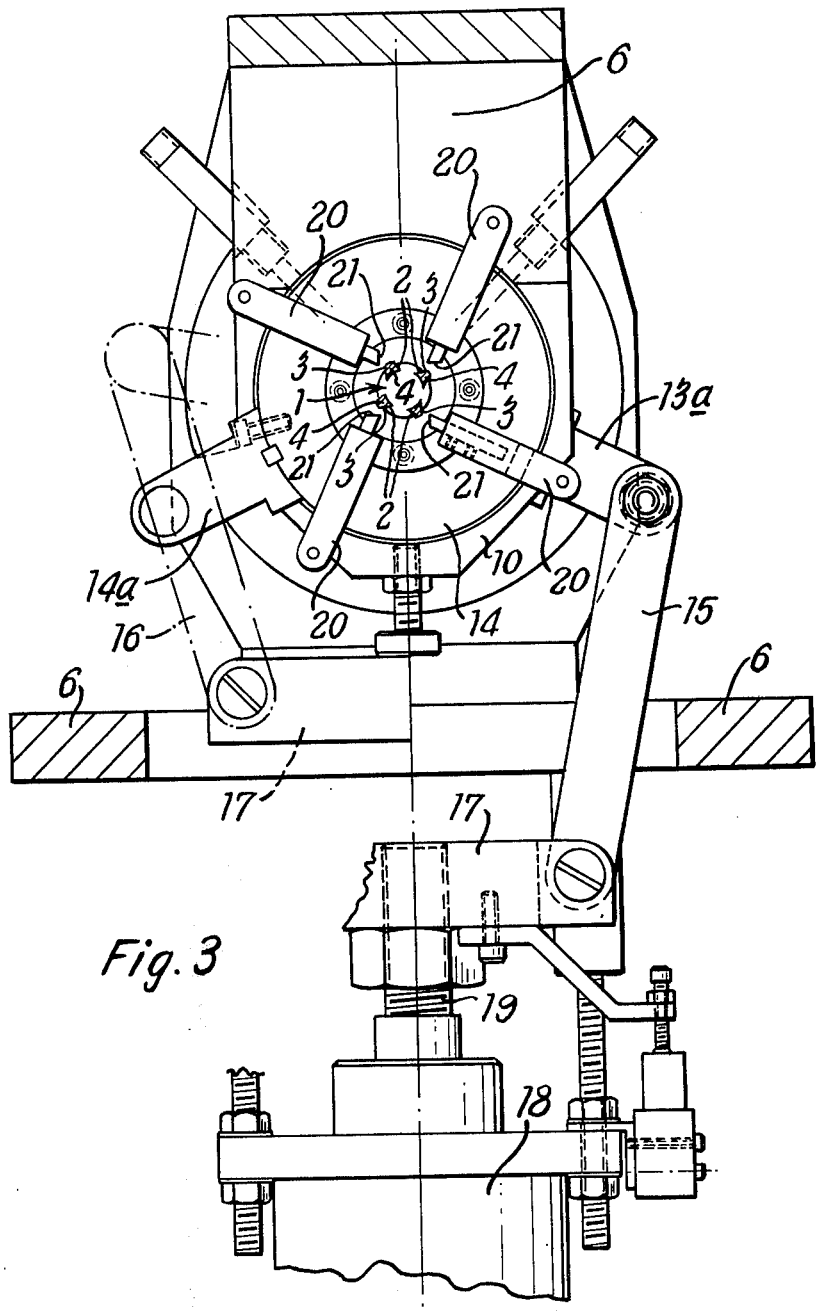
FIG. 3 is a front elevation of an apparatus constructed in acordance with the invention and suitable for de-burring the end faces of teeth on the pinion shown in FIG. 1.
Figure 4:
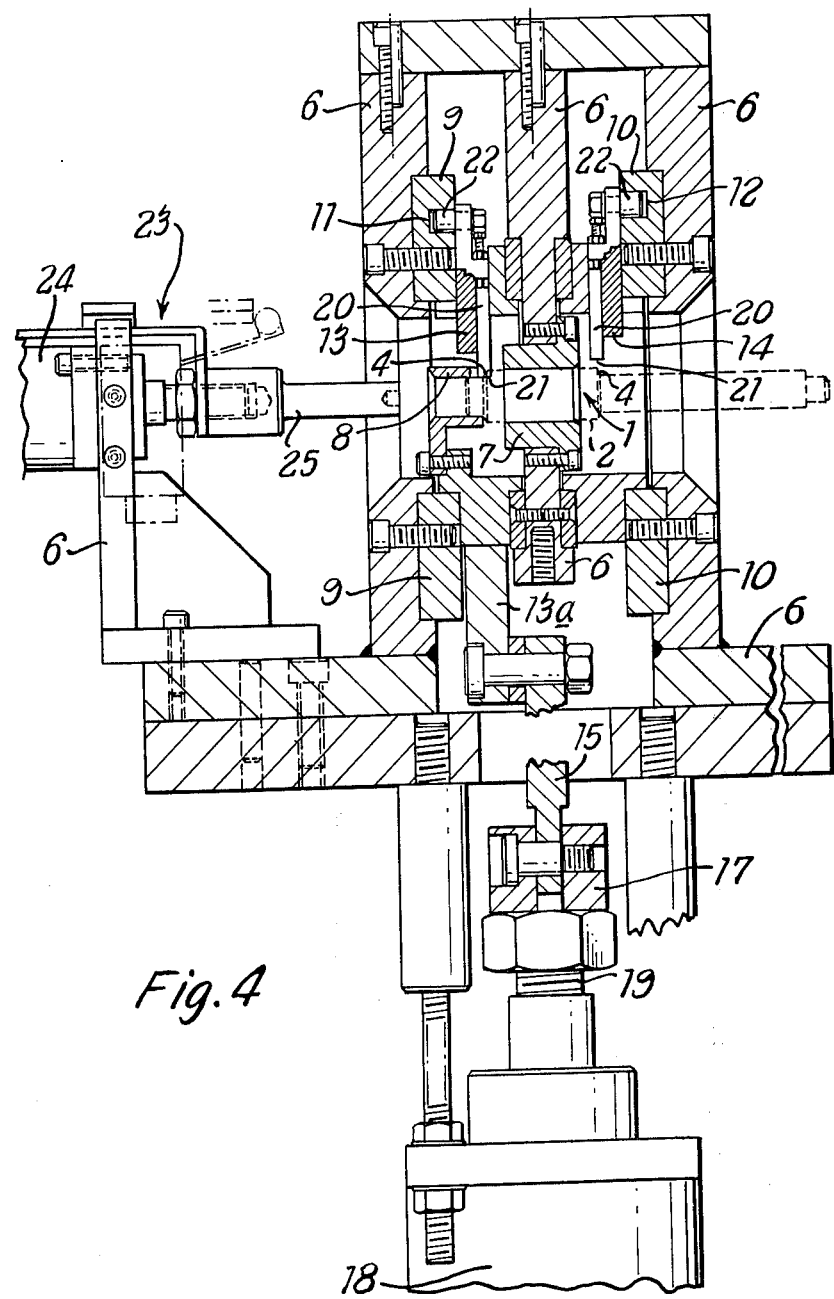
FIG. 4 is a side elevation in part section of the apparatus shown in FIG. 3.

While the carrying plates 13 and 14 can exhibit simultaneous rotary reciprocation through an arc which is predetermined by the stroke of the piston rod 19, it will be noted from FIG. 3 that the linkages formed by the levers are such as to rotate the carrying plates in opposite directions.

Mounted on each of the carrying plates 13 and 14 is a set of four cutting tools 20 having cutting edges 21. The cutting tools extend generally radially of the pinion 1 and are circumferentially spaced around the pinion so that the eight cutting edges 21 are in radial alignment one with each of the end faces 4 of the pinion teeth. The cutting tools 20 are slidably mounted in appropriate keyways (or slots) to be capable of radial movement inwardly and outwardly of their respective carrying plates 13, 14 and are restrained by such keyways from circumferential or sidewise movement relative to their respective carrying plates.

To provide for radial movement of the cutting tools 20 as the plates 13 and 14 are rotated by the links 13a and 14a, the cutting tools 20 are provided with cam followers in the form of studs 22 which engage the cam slots 11 and 12. Thus, each of the cutting tools 20 carried by the plate 13 has a stud 22 which engages one of the cam slots 11 in the fixed plate 9. Each of the cutting tools 20 carried by the plate 14 has a stud 22 which engages one of the cam slots 12 in the fixed plate 10.

Figure 5:
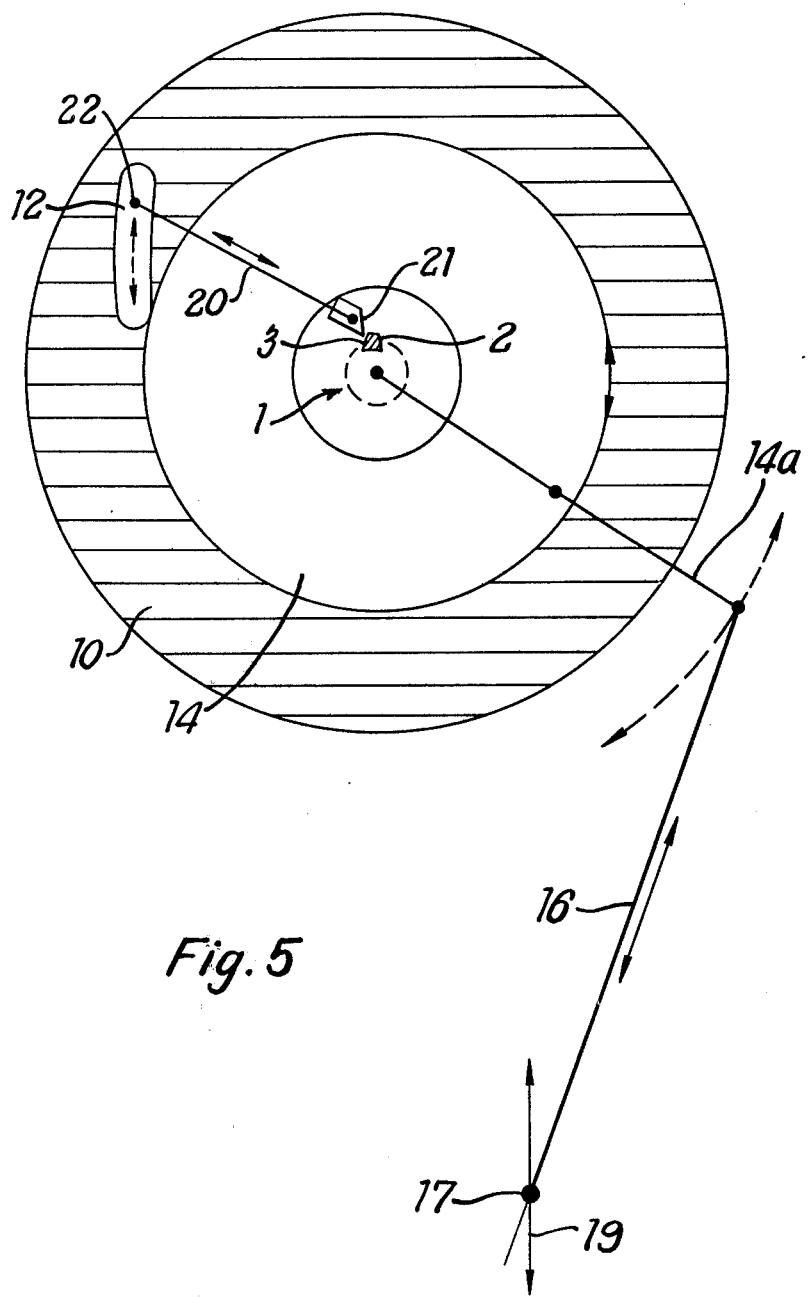
FIG. 5 diagrammatically illustrates the manner by which cutting tools in the apparatus of FIG. 3 are displaced both radially and circumferentially during de-burring of a gear.

The cam slots 11 and 12 are inclined relative to a notional radially extending line of the pinion and are of predetermined profile (preferably involute in the radial plane). When the carriage 17 is reciprocated linearly to impart reciprocable circumferential movement through the linkage levers to the carrying plates 13, 14, as will be seen from the diagram in FIG. 5, the cutting tools 20 (of which, for convenience, one only is shown in FIG. 5) are circumferentially displaced with their respective carrying plates and are simultaneously displaced radially inwardly or outwardly of the pinion by the control effected through the respectively associated cam slots and followers. By radial alignment of the cutting edges with the respective end faces of the pinion teeth, during radially inward displacement of the cutting tools the cutting edges may shave off any surplus metal or burr 3 which may be present on the respective end faces as above described with reference to FIGS. 1 and 2.

By appropriate shaping of the cam slots 11 and 12 the cutting edges may follow the profile of the edge of the pinion tooth at its end face (which profile will usually be involute as previously mentioned) to remove the burr at such edge with minimal removal of metal from the teeth. Alternatively, displacement of the cutting edges 21 may be arranged to cut chamfers (with or without burrs being present) on edges of the end faces of the teeth.

To alleviate the possibility of damage to the pinion during de-burring of chamfering of the teeth end faces, the stroke of the piston rod 19 is so arranged that the carrying plates 13 and 14 are circumferentially displaced through an arc which is compatible with each cutting tool effecting de-burring or chamfering of a single tooth end face and then withdrawing in preparation for a further operation.

Since the cutting tools 20 are controlled in their radially inward displacement to follow the profile of the pinion teeth (that is to say the above mentioned involute profile at the edge of the end face of the teeth from which edge the burr is to be removed), for helical teeth, the circumferential displacement of the two sets of cutting tools in opposite senses will be necessary—hence the reason for arranging the two linkages to displace the carrying plates 13 and 14 simultaneously in opposite circumferential directions.

For efficient de-burring or chamfering of an involute edge at the end face of a helically formed tooth as shown in FIGS. 1 to 2, it is preferred, as above-mentioned, that the cutting edge 21 of the cutting tool moves in a path parallel to the edge of the tooth which is being de-burred.

Conveniently the frame 6 carries a pinion ejection device 23 which simply comprises a fluid pressure operated ram 24 which axially displaces a piston rod 25 to abut the pinion 1 and eject it from the housing 7 after de-burring or chamfering.

For convenience of illustration, in FIG. 3 the carriage is drawn partly in its retracted position (with the extension lever 15 coupled thereto) and partly in its extended position (with the ghost extension lever 16 coupled thereto). Further, in FIG. 4 the set of cutting tools associated with the carrying plate 13 are shown in their radially inwardly displaced position as they would be immediately following de-burring or chamfering of the pinion teeth and the set of cutting tools associated with the carrying plate 14 are shown in their radially outwardly displaced position as they would be during removal of the de-burring pinion (and in readiness to effect de-burring of a further pinion which may be located in the housing 7), usually however, and as will be appreciated, both sets of cutting tools will be at similar positions and stages of de-burring simultaneously.

Having described one specific preferred embodiment of the invention, the following is claimed:

1. A method of removing surplus metal from the axial end faces of a plurality of teeth on a workpiece, said method comprising the steps of radially inwardly displacing a cutting means having a cutting edge for each tooth while simultaneously imparting circumferential rotation between the cutting means and the workpiece so that the cutting edges remove surplus metal from the end faces of their respectively associated teeth, and limiting said relative circumferential rotation so that each cutting edge is restricted to removing surplus metal from the end face of its associated tooth.

2. A method as set forth in claim 1 which comprises simultaneously removing surplus metal from all of the end faces at at least one axial end of the plurality of teeth.

3. A method as set forth in claim 1 which further includes controlling the radial inward displacement and the simultaneous relative circumferential rotation between the workpiece and the cutting means so that the paths of movement of the cutting edges substantially follow the profiles of their respective teeth during the removal of surplus metal.

4. A method as claimed in claim 3 in which edges of the teeth end faces from which surplus metal is removed are of substantially involute profile and which comprises controlling displacement of the cutting edges relative to the workpiece so that each said cutting edge substantially follows an involute path complementary to the edge of the tooth end face with which it is associated.

5. A method as set forth in claim 1 further including the step of simultaneously removing surplus metal from the end faces at both axial ends of the teeth.

6. Apparatus for removing surplus metal from the end faces of a plurality of teeth on a workpiece, said apparatus comprising cutting means having a plurality of spaced apart cutting edges disposed in a generally circular array, means for locating the workpiece within the circular array of cutting edges, means for moving said cutting edges radially inwardly toward the workpiece and for simultaneously imparting relative circumferential rotation between said cutting edges and the workpiece so that said cutting edges remove surplus metal from the end faces of teeth with which they are respectively associated, and means for limiting said relative circumferential rotation between said cutting edges and the end faces of the teeth to restrict the removal of metal by each cutting edge to an associated one of the teeth.

7. Apparatus as set forth in claim 6 in which said cutting means comprises a plurality of cutting tools each of which has an associated one of said cutting edges.

8. Apparatus as set forth in claim 6 wherein said means for moving said cutting edges radially inwardly includes a plurality of cam surface means for moving cutting means radially inwardly during relative circumferential rotation between said cutting means and the workpiece.

9. Apparatus as set forth in claim 6 wherein said means for locating the workpiece includes means for holding the workpiece stationary while the cutting edges are displaced radially inwardly and simultaneously circumferentially rotated relative to the workpiece to effect the removal of surplus metal.

10. Apparatus as set forth in claim 6 wherein the cutting means includes a set of cutting tools each of which is slidably mounted for controlled movement radially inwardly or outwardly relative to the workpiece.

11. Apparatus as set forth in claim 10 wherein said means for moving the cutting edges is radially inwardly and includes a first member on which said cutting tools are slidably mounted, a second member, and a plurality of cam surfaces connected with said second member, said first and second members being movable relative to each other so that during said circumferential rotation between the cutting edges and workpiece to provide controlled radial displacement of the cutting tools relative to the workpiece.

12. Apparatus as set forth in claim 11 wherein said cam surfaces are defined by slots in the second member, each said cutting tools having a cam follower disposed within an associated one of said slots.

13. Apparatus as set forth in claim 11 wherein said first member is adapted to exhibit circumferential rotation relative to both the workpiece and said second member and said cutting tools cooperate with said cam surfaces so that during said relative rotation the cutting tools are simultaneously displaced radially inwardly and circumferentially relative to the end faces of a workpiece.

14. Apparatus as set forth in claim 13 in which said means for limiting said circumferential rotation is adapted to reciprocate said first member in the circumferential direction so that the cutting edges are circumferentially displaced and radially displaced under control of said cam surfaces sequentially inwardly and outwardly of the workpiece.

15. Apparatus as set forth in claim 6 wherein said means for radially inwardly displacing said cutting edges and for simultaneously imparting relative circumferential rotation between said cutting edges and the workpiece is arranged so that said cutting edges remove surplus metal from the end faces of teeth on the workpiece along nonrectilinear paths.

16. Apparatus as set forth in claim 6 wherein said means for locating the workpiece comprises a socket which is adapted to receive part of the workpiece and has associated therewith means for circumferentially locating the workpiece with its teeth in a predetermined orientation relative to said cutting edges.

17. Apparatus as set forth in claim 6 wherein said cutting means includes first and second sets of cutting tools, said first and second set of cutting tools being axially spaced relative to the workpiece, said means for moving said cutting edges including means for moving said first and second sets of cutting tools relative to the workpiece to remove surplus metal from end faces of the teeth at both axial ends thereof.

18. Apparatus as set forth in claim 17 wherein said means for moving said first and second sets of cutting tools relative to the workpiece includes means for rotating said first set of cutting tools circumferentially in a first direction relative to the workpiece and for rotating said second set of cutting tools circumferentially in a second direction relative to the workpiece.

19. Apparatus as set forth in claim 6 wherein said means for limiting relative circumferential rotation between the cutting edges and the workpiece comprises a fluid pressure operated piston and cylinder device which is arranged to have a predetermined stroke and such stroke is transmitted through a linkage to impart said relative rotation.

20. Apparatus as set forth in claim 6 further including ejector means for ejecting the workpiece from said means for locating the workpiece subsequent to the removal of surplus metal from the end faces of teeth on the workpiece.

* * * * *